INVENTORS.
GEORGE H. HARE
DAVID R. MARGETTS
BY THEIR ATTORNEYS.
HARRIS, KIECH, FOSTER & HARRIS

July 21, 1959  G. H. HARE ET AL  2,896,083
RADIO FREQUENCY MASS SPECTROMETER
Filed July 27, 1953  4 Sheets-Sheet 4

INVENTORS.
GEORGE H. HARE
DAVID R. MARGETTS

BY THEIR ATTORNEYS.
HARRIS, KIECH, FOSTER & HARRIS

United States Patent Office 2,896,083
Patented July 21, 1959

2,896,083

RADIO FREQUENCY MASS SPECTROMETER

George H. Hare and David R. Margetts, Pasadena, Calif., assignors to Beckman Instruments, Inc., South Pasadena, Calif., a corporation of California Application July 27, 1953, Serial No. 370,582

33 Claims. (Cl. 250—41.9)

The present invention relates in general to the analysis of materials and, more particularly, to a radio frequency mass spectrometer for molecular mass analysis.

In general, the invention provides a radio frequency mass spectrometer which selectively varies the velocities of ions of a substance to be analyzed in such a way as to provide those ions having a predetermined mass with an optimum energy level. More particularly, the mass spectrometer of the invention selectively accelerates ions of a sample substance in such a manner as to impart maximum energy to ions of the predetermined mass, the accelerated ions being directed toward a collecting system which includes means responsive to ion energy level for diverting all ions but those of the predetermined mass. Preferably, the mass spectrometer comprises a tube having an evacuated envelope into one end of which the sample substance, such as a gas mixture, for example, may be introduced at a very low pressure, the tube also including an electron gun for ionizing the sample. The resulting ions pass into an analyzer within the envelope which includes a plurality of electrodes having direct and alternating potentials applied thereto in such a manner as to selectively accelerate the ions according to their masses, ions of one particular, predetermined mass being accelerated to an optimum, maximum energy level. From the analyzer, the selectively energized ions pass to the collecting system hereinbefore mentioned, only the ions of predetermined mass having received sufficient energy to enable them to arrive at a collecting means, such as a charged plate. The resulting ion current may appear on a suitable indicating means, or it may be utilized by a control means to perform a suitable control function, or the like.

A primary object of the present invention is to provide a radio frequency mass spectrometer having maximum mass resolution so that substances having components of only slightly different masses may be analyzed therewith.

More particularly, an object of the invention is to provide such a spectrometer having an analyzer with D.C. and radio frequency A.C. sections, all of the particles first being accelerated in the D.C. section to different velocities in accordance with their masses, and subsequently being selectively accelerated in the A.C. section in such a manner that particles of a predetermined mass receive maximum energy.

Another object of the invention is to provide such a spectrometer wherein the A.C. section for selectively accelerating the particles includes a plurality of electrodes spaced apart along the ion path and adapted to have a source of radio frequency alternating potential connected thereto. For example, the electrodes may be tubular elements, apertured discs, or the like.

An important object of the invention is to provide an A.C. section wherein the energy received by each ion of the predetermined mass at each interelectrode gap is constant throughout the entire section, this being insured by progressively increasing the effective lengths along the ion path over which the accelerating fields act at the interelectrode gaps from the upstream end of the A.C. section toward the downstream end thereof in such a way that each particle of the predetermined mass is exposed to the same accelerating potential for the same length of time at each interelectrode gap.

Another important object is to provide an A.C. section in which the transit time from one interelectrode gap to the next is constant throughout the entire A.C. section for particles of the predetermined mass.

The objects set forth in the two preceding paragraphs may be attained with tubular electrodes by progressively increasing the diameters and the lengths of the electrodes from the upstream end of the A.C. section to the downstream end thereof in accordance with the equation $$L_n = K R_n$$

where $R_n$ is the radius of the $n$th interelectrode gap, $K$ is a constant and $L_n$ is the stage length of the $n$th stage (at the center of which the $n$th gap is located), $L_n$ increasing toward the downstream end of the A.C. section as the square roots of integers since the ions of predetermined mass receive equal increments of energy between successive tubular electrodes. Generally similar considerations may be applied with apertured discs as the electrodes, $R_n$ being the radius of the $n$th aperture. However, with apertured discs in particular, it has been found than an insignificant loss of mass resolution occurs by making the apertures of constant diameter.

While the mass spectrometer of the invention may be used with an alternating potential of sine waveform applied to the electrodes of the A.C. section, an important object of the invention is to apply to such electrodes an alternating potential of square waveform to obtain superior current output in applications of the invention where such higher current output is desirable.

Another object of the invention is to employ, between the analyzer and the collecting electrode or electrodes of the collecting system, means for removing from the ion beam extraneous particles, such as free electrons, low energy ions, and the like.

A further object is to provide a collecting system having deflecting means for focusing the ion beam relative to the collecting electrode in such a way that only ions of the preferred mass impinge on the collecting electrode.

Another object is to frequency modulate the A.C. potential to decrease the sharpness of the mass peaks so as to reduce the rapidity of response required of the indicating means.

The foregoing objects and advantages of the present invention, together with various other objects and advantages thereof which will become apparent, may be attained with the exemplary embodiments of the invention illustrated in the accompanying drawings and described in detail hereinafter.

Referring to the drawings.

Figure 1A:
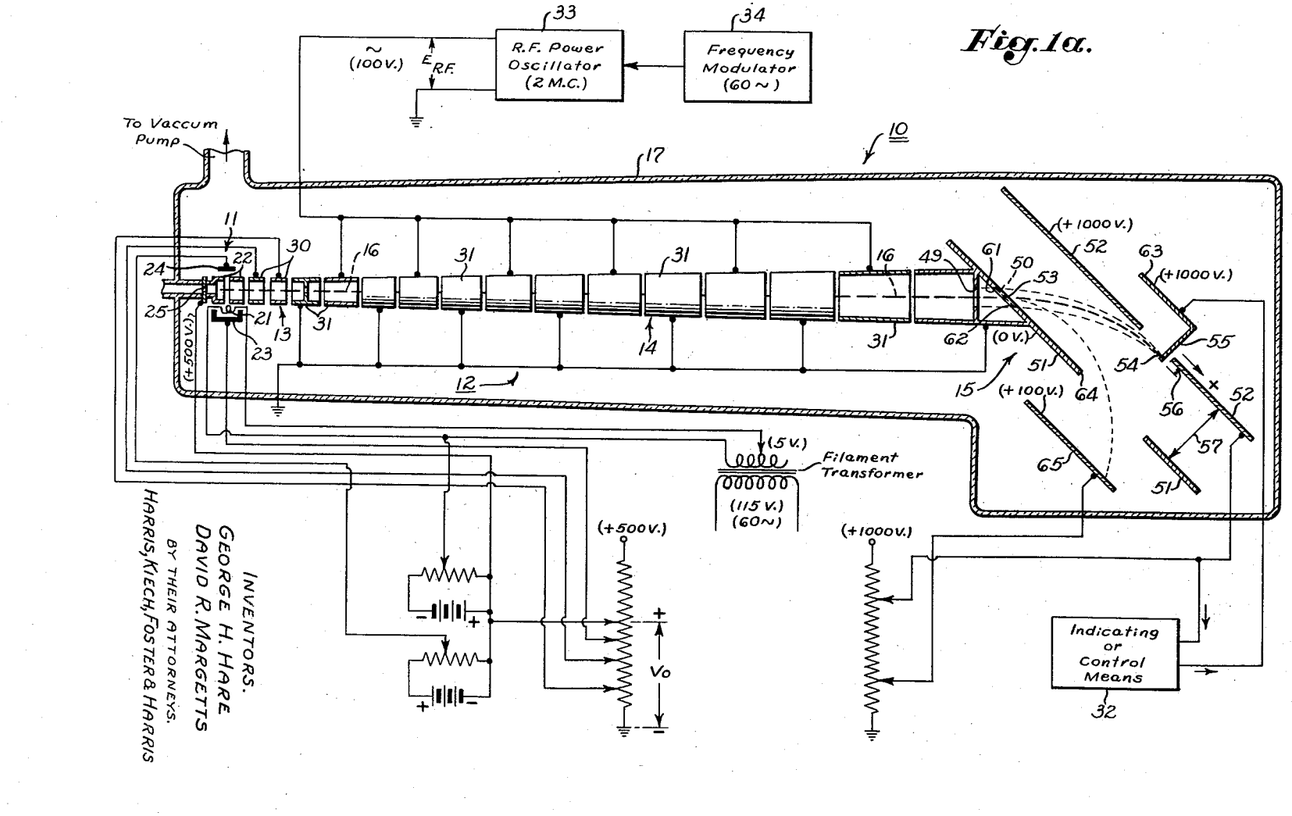
Figs. 1a and 1b are diagrammatic views of radio frequency mass spectrometers which embody the invention, the two embodiments differing only in external connections which are discussed hereinafter after describing the internal structure and operation of the invention.
Figure 1B:
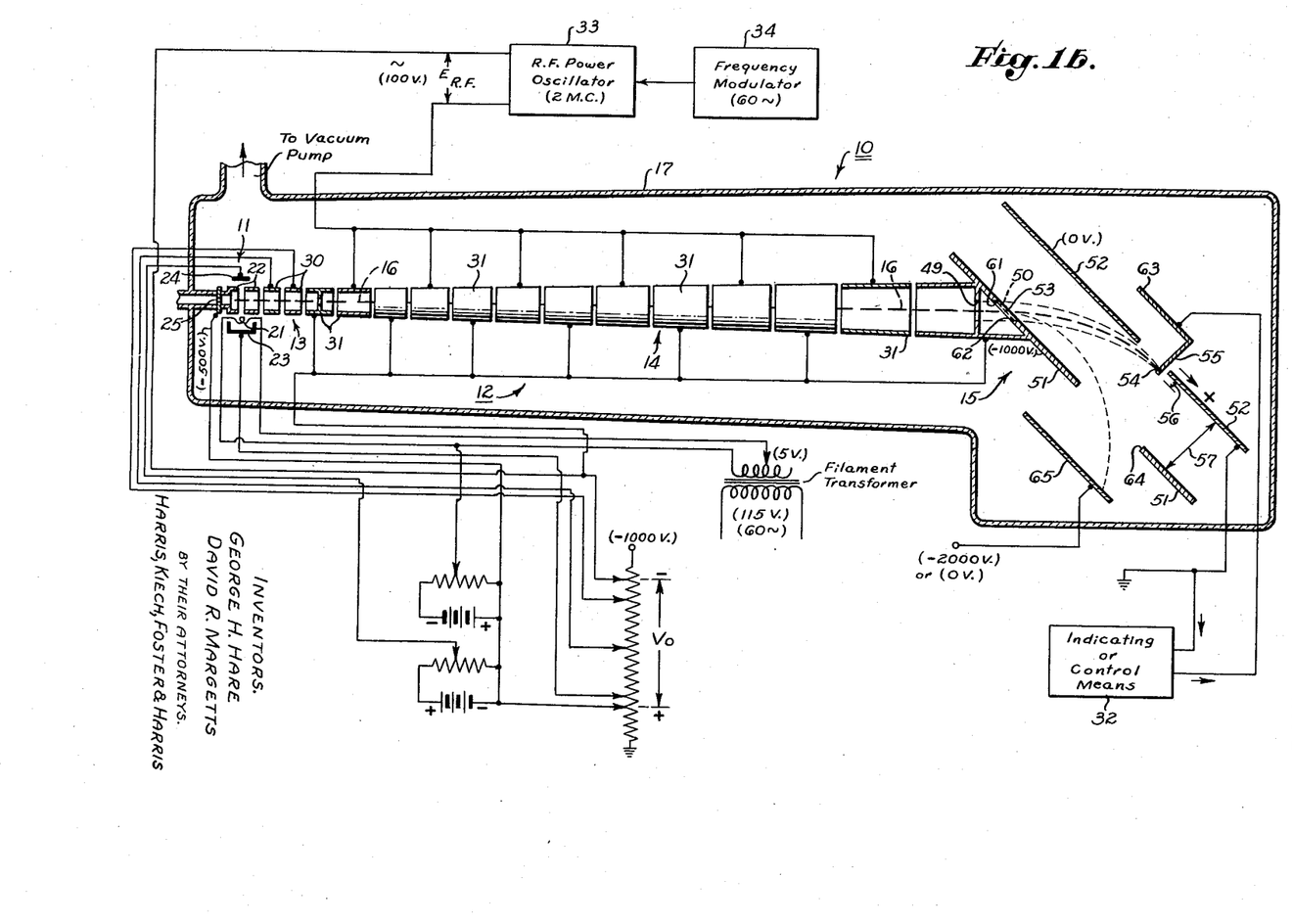

Referring either to Fig. 1a or Fig. 1b of the drawings, illustrated therein is a radio frequency mass spectrometer tube 10 of the invention which includes an ionizing structure 11, an analyzer 12 having sections 13 and 14, and a collecting system 15, the analyzer section 14 being an A.C., preferably radio frequency, section. The ionizing structure 11 and the collecting system 15 are disposed at the upstream and downstream ends, respectively, of an ion path 16 with the analyzer 12 disposed therebetween. The foregoing elements are disposed in an envelope 17 of any suitable material which is continuously evacuated by any suitable means, the evacuating means not being shown since such a device is well known.

Considering the ionizing structure 11, it includes a cathode 21 for producing electrons, the latter being accelerated in their approach to a more or less closed ionization chamber 22 in which ionization takes place. A filament shield 23 more or less encloses the cathode 21 to keep electrons from reaching elements other than the ionization chamber 22, and a potential between an electron collector 24 and the ionization chamber keeps secondary electrons formed at the collector 24 out of the ionization chamber 22. As a matter of convenience, all of the potentials throughout the entire tube 10 may be referred to the potential on the ionization chamber 22.

In order to ionize a gas mixture which is to be analyzed, a small sample of the gas mixture is introduced into the evacuated envelope of the tube 10 in the vicinity of the ionization chamber 22 so that ionization of the gas mixture occurs within this region as collisions occur between the accelerated electrons and the gas molecules. Preferably, the gas mixture is introduced into the ionization chamber 22 through a gas leak 25 by means of which introduction of the sample may be accurately controlled.

Thus, the elements thus far described serve as means for producing ions of the material to be analyzed, the material being a gas in the particular application of the invention under consideration. However, it will be understood that other ion sources may be employed with other materials if desired and that the invention is not to be regarded as limited to the particular ion source shown.

The ions formed by an electron beam in the ionization chamber 22 are drawn out and focused down the ion path 16 by the analyzer section 13, shown as comprising one or more tubular electrodes 30 to which D.C. potentials are applied. The last electrode effective in focusing the ion beam is the first of a series of tubular electrodes 31 of the radio frequency section 14, which is at a potential $V_0$, a negative potential with respect to the region of ionization. $V_0$ is the total D.C. potential through which all positive ions fall and establishes a spread of ion velocities according to mass. Changing one or more focus voltages on the electrode or electrodes 30 upstream from the first radio frequency electrode 31 does not change the velocity disposition of the particles when they arrive in this electrode, but only their focus and space disposition. The total D.C. accelerating potential applied to the ions between the first electrode 31 and the ionization chamber 22 is, however, made relatively large to obtain a relatively large velocity spread. Actually, either positive or negative ions may be accelerated into the A.C. section 14 by the D.C. section 13 and the following discussion will be based on positive ions as a matter of convenience, it being obvious that negative ions may be handled by reversing polarities throughout the remainder of the tube 10.

The A.C. section 14 of the analyzer section 12 includes, as indicated above, the axially aligned tubular electrodes 31 which are spaced apart along the ion path 16, the first electrode 31 also being spaced from the next upstream electrode of the focusing section 13. Alternate ones of the electrodes 31 are electrically interconnected as shown, the two groups of electrodes being connected to a suitable source of alternating potential, preferably radio frequency, in such a manner that adjacent electrodes are of opposite polarity at any instant. This may be accomplished by connecting the two groups of electrodes 31 across the output terminals of an oscillator 33. For typical operating conditions of this device the velocity change in the first interelectrode stage is about 10% and less than this for succeeding stages.

As will be discussed in detail hereinafter, the A.C. section 14 of the analyzer 12 differentially accelerates the ions of different velocities entering it from the D.C. section 13 in such a manner that ions of a predetermined mass receive optimum or maximum energy, the ions of predetermined mass representing a component of the material being analyzed. The ions, differing in energy in accordance with mass, together with various other charged particles, such as stray ions formed downstream from the ionization chamber 22, secondary electrons emitted from the electrodes 31 and the like, are discharged from the A.C. section 14 into the collecting system 15, which will be described in detail hereinafter.

Suffice it to state here that the resulting signal or ion current developed in the collecting system 15 is a measure of the relative abundance of the ions of the predetermined mass, and the proportion of the ions of the selected mass to the ions of all masses present in the sample being analyzed may be determined by scanning the entire mass range present in the sample. As suggested above, the ion current resulting in the collecting system 15 may be used to actuate an indicating means, such as a suitable meter, or may be used to perform a control function, such as to control the proportions of selected molecular components present in the material being analyzed. Such an indicating or control means is designated 32 in the drawings.

Figure 5:
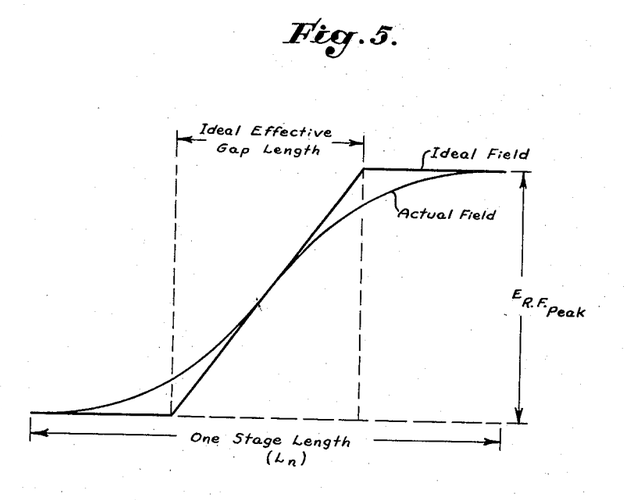
Fig. 5 is a view comparing the actual and ideal fields applied to the ions throughout one A.C. analyzer stage length.

It is convenient to consider first the general mode of operation of the A.C. analyzer section 14 before considering the structure and mode of operation thereof in detail. First of all, it will be understood that the electric field at each one of the gaps between the electrodes 31 is alternately directed in the upstream and downstream directions, the field at each interelectrode gap acting in the downstream direction during one half of each cycle of the alternating potential and acting in the upstream direction during the succeeding one-half cycle. Also, the fields at adjacent gaps act in opposite directions at any one instant because of the alternate manner in which the electrodes 31 are connected to the A.C. potential source. Referring to Fig. 5 of the drawings, an "ideal" field throughout one stage length is designated by the corresponding legend and is shown in straight lines, a stage length being the distance from the middle of one electrode 31 to the middle of the next. This "ideal" field is only an approximation for the tubular electrodes 31, but it facilitates consideration of the action of the field. The actual field between two tubular electrodes 31 as a function of distance, taken at the instant of the peak voltage difference, $E_{RFPEAK}$, between electrodes, is shown curved.

Figure 2A:
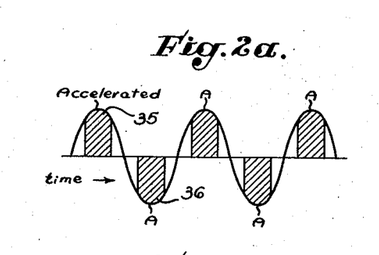
Figs. 2a to 2c are diagrammatic views illustrating the operation of the invention with an alternating potential of sine waveform applied to the A.C. analyzer section.

Referring to Fig. 2a with the foregoing in mind, it will be assumed that a positive ion of the predetermined mass enters the gap between the first electrode 31 and the second electrode 31 when the field at this gap is acting toward the downstream end of the path 16, i.e., when the second electrode 31 is negative relative to the first electrode 31. If the ion of the preferred or predetermined mass enters this first gap in phase with the peak value of the accelerating potential, it receives an energy increase roughly represented by the shaded area marked "accelerated" and designated by the numeral 35 in Fig. 2a (throughout Figs. 2a to 4c, "A" means accelerated, "D" means decelerated, and "t" means time). The width of the shaded area 35 indicates the time it takes the preferred ion to traverse the field at the first gap and corresponds to the ideal effective gap length of Fig. 5. The area of the shaded portion 35 also represents, approximately, the energy gained in the stage length involved. After being accelerated by the potential difference across the first gap, the ion of the preferred mass drifts through the second of the electrodes 31 and arrives at the second gap in phase with the peak potential across this gap. In other words, the ion of the preferred mass arrives at the second gap substantially one-half cycle after entering the first gap so that the third of the electrodes 31 is negative relative to the second electrode 31, whereby the ion of the preferred mass is additionally accelerated as it traverses the field at the second gap as indicated by the shaded area 36. The same thing occurs at each of the subsequent gaps, the ion of preferred mass receiving an additional increment of energy as it crosses each gap. Ultimately, the ions of preferred mass pass all the way through the A.C. section 14 in this fashion.

Figure 2B:
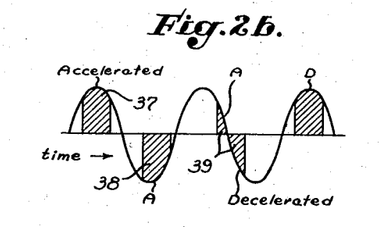

However, an ion which is heavier than the preferred ions may not pass through the A.C. section at all, or passes therethrough with a relatively low energy level, even though it enters the first gap, between the first and second electrodes 31, in phase with the peak accelerating potential. This situation is shown in Fig. 2b of the drawings, wherein a heavier-than-preferred ion is shown as receiving an increment of energy represented by the shaded area 37. However, because of the fact that this ion is heavier than the preferred ions, it is not accelerated to a sufficient velocity by the increment of energy it receives at the first gap. Consequently, when it arrives at the second gap, it arrives somewhat behind the peak accelerating potential, as indicated by the shaded area 38, and is still further behind the peak accelerating potential by the time it arrives at the third gap. By the time it arrives at the third gap, it may be so far behind the peak accelerating potential that it is actually subjected to a decelerating potential for at least part of the time that it takes it to cross the field at the third gap so that it begins to lose energy, this being indicated by the split shaded area 39. Consequently, such a heavy particle will ultimately reach the collecting system 15 with a much lower kinetic energy level than the preferred particle. Similarly, a particle having a mass smaller than the preferred mass has too much velocity at the first gap, especially if it enters in phase with the peak accelerating potential. Consequently, such a lighter ion arrives ahead of the peak accelerating potential at the first gap and gets farther and farther ahead as it traverses the fields at the succeeding gaps. Ultimately, the excessively light particle is actually decelerated so that it also arrives at the collector with a considerably lower energy level than the preferred ions.

The foregoing considerations are modified if a light particle attains a phase-stable condition, as will be described hereinafter.

Figure 3A:
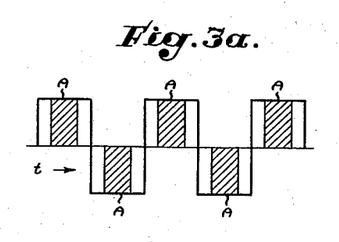
Figs. 3a to 3c are diagrammatic views illustrating the operation with an alternating potential of square waveform applied to the A.C. analyzer section.
Figure 3B:
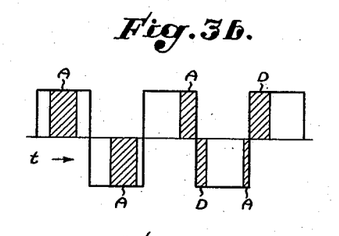
Figure 4A:
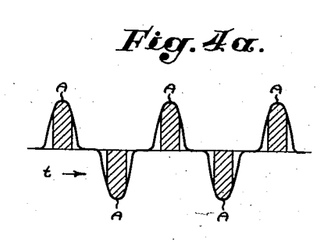
Figs. 4a to 4c are diagrammatic views illustrating the operation with pulses of potential applied to the A.C. analyzer section.
Figure 4B:
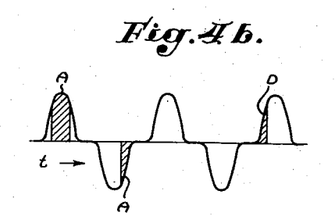

Figs. 3a and 3b correspond to Figs. 2a and 2b, respectively, with a square wave applied to the electrodes 31 instead of a sine wave, and Figs. 4a and 4b respectively correspond to Figs. 2a and 2b with a pulse wave substituted for a sine wave, and Figs. 4a and 4b respectively Considering the structure of the A.C. section 14 in more detail in the light of the foregoing, it will be apparent that, in order to permit the use of an alternating potential of constant frequency throughout the entire section, and to produce a constant energy increase in each stage, it is necessary to progressively increase the electrode stage lengths, i.e., the distances between electrode midpoints, as the velocity of the ions of preferred mass increases so that such ions remain in phase with the alternating potential. In other words, the ratio of the stage lengths of any pair is equal to the ratio of the average velocities of the ions of preferred mass therethrough.

The velocity, $v$, of the ions of preferred mass increases substantially as follows:

$$v_n = \left[\frac{2e}{m}\left(V_0 + \frac{2n-1}{2}E_{RF}\right)\right]^{1/2}$$

where $v_n$ is the average velocity in the $n$th stage, $V_0$ is the D.C. accelerating potential (all ions having $eV_0$ electron volts energy as they enter the A.C. analyzer section 14), $m$ is the mass of the preferred particle, and $e$ is the ion charged carried by the particle. $E_{RF}$ is the effective value of the A.C. wave in an A.C. stage and is approximately equal to the maximum value of $$\int_{-\frac{L_n}{2}}^{+\frac{L_n}{2}} \epsilon(x,t)\,dx$$

the maximum being taken with respect to the phase angle of entrance into the $n$th stage, and with respect to the mass $m$ or mass number, M. $\epsilon(x,t)$ is the instantaneous electric field experienced by an ion at a point $x$ and a time $t$ in the field, and is the result of the electrostatic field configuration of the tubular electrode structure and the form of the A.C. potential with time. $E_{RF}$ may be assumed to be constant for any value of $n$.

In order to maintain constant the increments of energy received by the ions of preferred mass at the various gaps, it may be desirable to maintain geometrical similarity between the fields at all gaps, i.e., to insure that the effective gap length is a constant proportion of the stage length, $L_n$. Accordingly, an important feature resides in progressively increasing those lateral electrode dimensions which affect field shape. In the case of the tubular electrodes 31, this means progressively increasing the gap diameters. As will be understood in the case of the tubular electrodes 31 increasing the gap diameter causes the accelerating field to extend farther into both of the electrodes forming each gap so that the effective gap length, i.e., the accelerating field length, increases. This helps insure that each ion of the preferred mass is exposed to the accelerating potential for the same length of time at each one of the gaps in the A.C. section 14 so that it receives equal increments of energy at all of the gaps. This situation is illustrated in Fig. 2a of the drawings, wherein an ion of the preferred mass is shown as being exposed to the peak accelerating potential for the same length of time at each of the gaps, the time of exposure to the accelerating field being represented by the width of the shaded areas 35, 36, etc.

If the diameters of the gaps were not progressively increased, the effective gap lengths, i.e., the lengths of the accelerating fields, would not be constant throughout the entire A.C. section 14. The result of this would be that an ion of the preferred mass would receive more energy from the gaps through which it passed at a higher velocity, assuming it was in the proper phase with the radio frequency wave, since the effective $E_{RF}$ across all the stages would not be the same.

The gap diameters are related to the stage lengths by the equation $$L_n = KR_n$$

where R is the radius of the $n$th gap, K is a constant and $L_n$ is the length of one stage (the $n$th). The gaps are at the exact centers of the stages. In the case of the tubular electrodes 31, the $n$th electrode length, $l_n$, is equal to $$\frac{K}{2}(R_{n-1} + R_n)$$

the lengths of the electrodes 31 being slightly different from the stage lengths, $L_n$. From the foregoing equations, it will be seen that each gap and the electrode halves adjoining it are geometrically similar to every other gap and its adjoining electrode halves, except for the fact that the gap widths themselves are preferably constant. The effective gap length, $L_G$, is equal to $4_R$, for the tubular electrodes 31. (For plate electrodes, hereinafter described, $L_G=L$.) While other values may be taken for the effective gap length, it is convenient to consider it as that distance in which 90% of the energy increase encountered by each ion of the preferred mass occurs, this being the case for the tubular electrodes 31. In other words, the effective gap length may be regarded as the distance the ion of preferred mass travels from a point wherein it has receiver 5% of the energy increase at a particular gap to a point where it has received 95% of the energy increase.

Therefore, as long as the lengths of the tubular electrodes 31 increase as the velocity of the ions of the preferred mass increases and as long as the gap radii increase in the manner discussed above, ions of the preferred mass which enter the first gap in phase with the peak accelerating potential remain in phase throughout the entire A.C. section 14 and receive substantially equal increments of energy at all of the gaps, which is an important feature of the invention. Thus, the conditions illustrated graphically in Fig. 2a of the drawings obtain as long as the foregoing requirements are met.

It is important to note that the D.C. section 13 of the analyzer 12 provides each particle with an initial velocity determined by its mass so as to produce a velocity spread mass as the particles enter the A.C. section 14. The use of D.C. section to obtain a velocity spread results in superior mass resolution by the A.C. section, as well as better focusing of the ion beam, which are important features of the invention.

It might be well to point out for any particular ion mass, there is a critical relationship between the amplitude and the frequency of the alternating potential, the D.C. acceleration potential and the length of the first stage, $L_1$, of the A.C. section 14, which relationship must be fulfilled to carry the ions of the preferred mass through the analyzer 12 at the maximum or optimum energy level. In this relationship, $$M = A\left(\frac{E_{RF} + 2V_0}{K^2 R_1{}^2 f^2}\right)$$

where M is the mass number of the preferred ion, A is a constant depending upon the units of the quantities in the equation, $E_{RF}$ is the effective radio frequency potential across any radio frequency gap for the preferred ion (see definition previously given), $V_0$ is the D.C. accelerating potential, K is the numerical constant which gives the ratio of length of a stage to radius of the gap at the center of that stage ($L_n=KR_n$), $R_1$ is the radius of the first radio frequency gap, and $f$ is the frequency of the wave.

The length of the first electrode, $l_1$, is not critical, its length merely being kept short enough so there is no loss of current therein to the electrode surface due to an excessively long drift space.

Figure 2C:
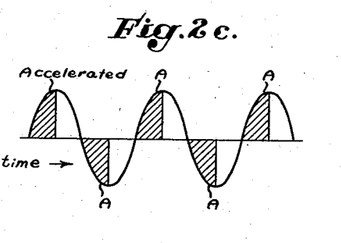

Considering the phase-stable phenomenon for lighter-than-preferred particles which was alluded to earlier herein, under certain conditions of gap length and R.F. waveform, such particles tend to seek a place on the radio frequency wave such as to enable them to cross successive gaps 180° apart. Thus, they pass through all of the gaps while receiving substantially the same amount of energy at each gap, an energy somewhat less than the peak energy being received by the preferred mass particles. The tendency for particles lighter than the preferred ones is to acquire the same velocity as the preferred particles, or receive an energy from the whole analyzer proportional to their mass, the kinetic energy, $V_L$, of such phase-stable, light particles gained in the A.C. section 14 being given by the equation $$V_L = \frac{m_L}{m_P} V_P$$

where $V_P$ is the energy of the preferred particle from all the gaps of the A.C. analyzer section 14, $m_L$ and $m_P$ being the masses of the light and preferred particles. This effect becomes more or less pronounced as the following tendencies in analyzer design are followed:

As K is made larger, fewer lighter-than-preferred particles are in a phase-stable condition for a tube 10 with a given number of radio frequency stages. Because resonance at a phase-stable position on the radio frequency cycle is never exactly achieved, the particle oscillates about the phase-stable position on the cycle, one such oscillation perhaps occupying a number of stages for its completion. This oscillation may be wider in phase than the phase angle represented by the peak, or nearly peak, portions of the radio frequency waves in Figs. 2c, 3c, and 4c. There, each of the shaded portions represents effectively the transit angle corresponding to the particles crossing the corresponding effective gap length. As K is increased, either by reducing all the radii of the electrodes 31, or by increasing the lengths of the stages, it becomes more probable that the oscillation about the phase-stable position will carry the particle, in a few stages, into a region of the radio frequency cycle where it will not even acquire the velocity $V_L$, mentioned above, provided the transit angle spans all or nearly all of 180° of a sine or square wave, or, in the case of a pulse-type waveform, provided it spans nearly all of the non-zero portion of the waveform. Referring to Fig. 2c, a light particle is assumed to be crossing gaps in a region of the cycle where the process is a steady state, or phase-stable, but imagine that the particle in the first several radio frequency stages is retarded or accelerated because of entry into the first stage at a phase substantially different from that of Fig. 2c. The particle will have to oscillate or move to the phase-stable position on the radio frequency waveform, and if the amount it must move is smaller than the angle represented by the width of the region of radio frequency peak value, it is likely to stay in oscillation about the position represented in Fig. 2c. But if it must move a phase distance which is appreciable compared to the width of the peak value of the cycle, it may fall out of step with the waveform.

Figure 3C:
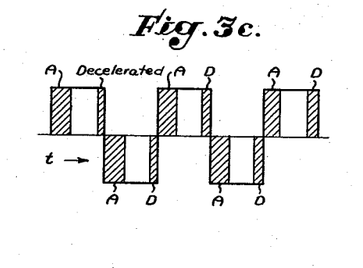

The waveshape employed has an effect on the degree to which the system operates in a phase-stable manner, for a fixed number of stages. The A.C. analyzer section 14 will always exhibit phase-stability operation for ions lighter than the preferred, but the permissible angle range of phase oscillation is determinative of the extent to which the phase-stable condition applies to all the light ions in the analyzer. More or less all particles lighter than the preferred particles are finally in phase stability at the downstream end of the analyzer, depending on the value of K and the shape of the waveform. Figs. 2c, 3c and 4a show several practical possibilities of acceleration for some practical values of K and different waveforms.

Figure 4C:
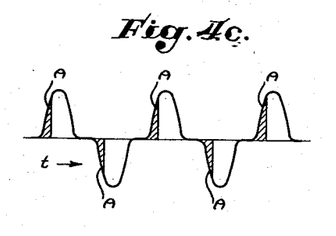

Fig. 4c indicates that the possible phase angle of oscillation is smaller with the pulse wave than with the sine wave, Fig. 2c, and that with the sine wave it is smaller than with the square wave, Fig. 3c. This permissible range determines how many of the light particles are phase stable at the downstream end of the A.C. analyzer section 14. The energy separation between the preferred particle and a lighter particle is greater if that lighter particle has lost the resonance velocity, i.e., slipped out of phase stability. The fewer light particles in phase stability, the better the resolution.

This instrument may be operated with any waveform and any K. It is desired that the transit angle across the effective gap length be less than the pulse width of the wave in order to use the critical effect of short pulses to obtain high resolution.

In general, we have found that square wave operation gives increased current for comparable resolution over sine wave operation, because the acceptance phase is not as critical (see Figs. 2a, 3a, 4a). Increasing K and keeping the waveshape a pulse of length of the order of the transit angle of the gaps improves resolution, but decreases the resulting ion current, I, as about $$I \sim \frac{1}{K}$$

In scanning such a mass resolving device, by varying the frequency, for example, the mass peaks, i.e., ion current peaks in the collecting system 15, may appear triangular with very sharp tops. This means the indicating or control means 32 must be rapid in its response to the full peak values of the mass curves—otherwise the full peak values of the mass curves will not be recorded or indicated. The sharpness of the peak seen on a recording device may be decreased by frequency modulating the radio frequency wave with a smooth waveform, as a sine waveform, a frequency modulator being shown at 34. The modulation period is long compared to the period of the basic R.F. wave, but short with respect to the response time of any indicating device used to register the mass peaks.

The indication at the means 32 at any mass position is then a time average, taken over the modulation cycle, of a large number of readings immediately in the neighborhood of the given mass position. The averaging or integrating effect of a smooth modulating waveform accordingly is to convert the sharp top to a rounded top, changing the position of the maximum value but slightly with respect to mass position or amplitude if the fractional change of frequency is made small. The fractional frequency change needs be only large enough to allow the recording or control instrument 32 time to substantially reach the top of the peak before the signal amplitude from the collecting system 15 of the spectrometer decreases.

In the case of a system where the mass peaks without modulation are symmetrical about the maximum on the mass scale, the modulating waveform (that is, the radio frequency as a function of time) may be a square wave, so that the radio frequency oscillator is changed step-wise. The resulting peak shape on the mass scan is then a flat topped waveform, which is desirable.

Turning now to a consideration of the collecting system 15, the collimated ion beam from the A.C. section 14 of the analyzer 12 passes through a slit 49, through a screen 50, and into a uniform electric field between charged plates 51 and 52. For example, assume that the beam enters the field at about 45° to the plates and experiences a force tending to return it to the plate 51, it being understood that any angle between 0° and 90° may be used, 45° being illustrative only. The particles of different energy will attain different maximum distances from the plate 51, the particles of maximum energy attaining the greatest maximum distance. The potential between the plates 51 and 52 is so adjusted that a preferred particle entering at the point 53 at an angle of 45° to the field passes through the point 54, close to the plate 52. At the point 54 is placed the edge of a blade or plate 55 extending through a slot in the plate 52 into the interplate space a small distance 56, e.g., about 1/100 of the plate spacing 57. The distortion of the uniform field due to the presence of the blade 55, as well as the slot in the plate 52, is localized to a region immediately around the blade edge and around the slot in front of the blade edge. The particles which would pass through the point 54, if there were no distorting blade 55 and slot, will pass, to a good approximation, through the point 54 when the slot and blade are present.

The beam coming into the uniform field space between the plates 51 and 52 has a definite width, e.g., about 3 millimeters. It is desired that as many as possible of the preferred ions in the whole width of the beam be brought through a line perpendicular to the plane of Fig. 1 at the point 54. At the same time, it is desired that the particles of different energy be separated, along a normal to the plates 51 and 52 through the point 54, by as great a distance as possible in comparison to the width of the beam of any given energy measured along this same line. The particles of the same energy represent, in the collecting system 15, particles of the same mass. The electric field characteristics of the inclined collecting system afford a means of producing a spread between two particles with different energy, an a focus of two particles with the same energy as follows: Consider the paths of particles entering from point 61 and 62, which define the beam width, all with same energy. Each particle path is a parabola with a maximum distance from the plate 51 determined by the entrant angle and energy of the particle, but not by the position of the particle between the points 61 and 62. The tops of all the parabolas of particles from the points 61 to 62 define a straight line envelope. This envelope moves away from and toward the plate 51 as $V_D$, the potential between the plates 51 and 52, is increased or decreased, respectively. If frequency is varied to provide mass scanning, then the preferred particle has a constant energy as the mass range is scanned, and the paths for preferred ions of different masses are always the same, ranging for each mass from the path between the points 61 and 54 to that between the points 62 and 54, as each mass becomes, in turn, the preferred mass as determined by the frequency scan. Thus, no change of geometry is necessary in the scanning of different masses.

Two important problems in the collecting system 15 arise if it is desired that the ion current be read correctly to within approximately 1%, viz., that of keeping secondary electrons from the collector electrode or blade 55 itself from escaping to some other place, and that of preventing secondary electrons, arising from collisions of the nonpreferred part of the deflected beam with different parts of the collector system, from reaching the collector electrode.

Considering the first problem, secondary electrons must arise from the point 54 and can have, at formation, no velocity component in the $+x$ direction since they arise from a surface facing in the $-x$ direction. Inspection of the electrostatic potential lines in the neighborhood of the point 54 indicates that a secondary electron arising at the point 54 in any direction with a $-x$ component will tend to be deflected back through the slot in the top deflection plate 52 and to hit a plate 63 attached to the collector, or will tend to hit the collector blade 55 itself. More precisely, let $eV_s$ be the maximum kinetic energy of secondaries from the point 54 to be suppressed, let $V_d$ be the total deflection potential between the deflection plates 52 and 51, and let $d$ be the distance therebetween. Also, let $$a = \frac{V_s}{V_d} d$$

Then, by making the slot width in the plate 52 equal to $4a$ on the $-x$ side of the blade 55 and by making the length of the blade projecting into the space between the plates 52 and 51 equal to or less than $2a$, substantially all electrons with a kinetic energy equal to or less than $eV_s$ are returned to the collector blade 55 or the plate 63. We may consider that the equipotential line representing a potential negative with respect to the top plate by an amount $V_s$ is not penetrated by the secondaries having a kinetic energy equal to or less than $eV_s$. This equipotential line is a "barrier" between the collector electrode 55 and the upper plate 52 since it folds into the gap and "deflects" the secondaries from the point 54 into the gap or back to the point 54. The large plate 63 is attached to the electrode 55 to insure the collection of all secondaries from the point 54.

Considering the second problem mentioned, secondaries reaching the collector means 55, 63 and not originating thereon would necessarily arise from that part of the plate 51 opposite the point 54 because the strong field accelerates secondaries from this part to the point 54. A hole 64 is cut in the plate 51, however, opposite the point 54, the hole being as large as possible without appreciably disturbing the uniform field in the region of the path 53, 54 of the preferred ions. A plate 65 is added and a potential applied so secondaries from this plate will return thereto. This is exemplified by the arrangement of Fig. 1a. In some applications, it may be desirable to make the plate 65 of such potential that no hole effect is produced by the hole 64 in the plate 51, the plate 65 also being positioned far enough from the plate 51 that collisions do not occur under the hole 64. This is exemplified by the general arrangement of Fig. 1b. Inherently, no secondaries from the plate 52 will hit the point 54 since no particle strikes it, even the highest energy particles being separated a distance from the plate 52 equal to the inwardly projecting length of the blade 55.

Turning now to a consideration of the external connections to the spectrometer tube 10, two different sets of external connections are illustrated in Figs. 1a and 1b, respectively. (Also, exemplary potentials which may be applied to various elements are noted on Figs. 1a and 1b, it being understood that such potentials are illustrative only. Fig. 1a illustrates external connections which involve grounding one side of the oscillator 33, the advantage of this being that alternate electrodes 31 of the A.C. or R.F. section 14 may be mounted directly on a metal envelope 17 which is at ground potential, without using insulators in the support members for the electrodes 31, although it is, of course, necessary to insulate the electrodes from each other. However, one set of the electrodes 31, including the first and last, and including the deflection plate 51, may be maintained at ground potential by mounting them directly on the metal envelope. In Fig. 1b, the indicating means 32 is at ground potential, this being advantageous if the ion current or signal is so low that stray fields affect the reading. It is easier to shield against such fields if the indicating means is at or near ground potential. Also, there is no necessity for insulating switches, scale controls, or the like, on the indicating means 32 from the operator, since he may also be grounded.

Figure 6:
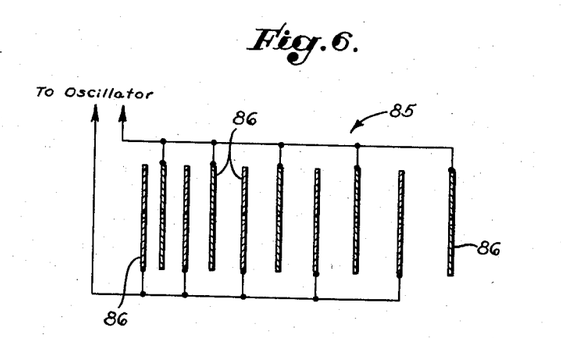
Fig. 6 is a diagrammatic view of an alternative A.C. analyzer section.

Referring to Fig. 6 of the drawings, illustrated therein is an A.C., preferably radio frequency, analyzer section 85 which is similar to the A.C. analyzer section 14 described previously, the principal difference being that apertured plates, preferably apertured discs 86 are substituted for the tubular electrodes 31. The spacing of the discs 86 progressively increases in the same manner as the spacing of tubular electrodes 31, and the diameters of the apertures in the discs may increase progressively in the same manner as the diameters of the gaps between the electrodes 31. However, it has been found that, as a practical matter, the apertures in the discs may all be of the same size, if desired, and they are so shown in Fig. 6 of the drawings.

Although we have disclosed exemplary embodiments of our invention herein for purposes of illustration, it will be understood that various changes, modifications and substitutions may be incorporated in such embodiments without departing from the spirit of the invention.

We claim as our invention:

1. In a mass spectrometer, the combination of: ionizing means at the upsteam end of an ion path for ionizing a sample substance to produce ions thereof; a sample-introducing leak communicating with said ionizing means for introducing the sample substance into said ionizing means to be ionized therein; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of successively adjoining electrodes spaced along said path to define between successive pairs of said electrodes corresponding interelectrode stages progressively varying in length according to the progressively varying velocity of said ions of selected mass, and including an alternating potential source connected to said electrodes for providing adjacent electrodes in said array with alternatingly opposite polarities; and ion collecting means at the downstream end of said path for collecting said ions of selected mass.

2. A mass spectrometer according to claim 1 wherein the lengths of said interelectrode stages progressively vary along said path as a square root function of the distance along said path.

3. In a mass spectrometer, the combination of; ionizing means at the upstream end of an ion path for ionizing a sample substance to produce ions thereof; analyzer means on said path downstream from said ionizing means for selectively varying the velocities of said ions in progressive degree along said path according to the respective masses thereof so as to provide those ions of a selected mass with an optimum kinetic energy along said path, said analyzer means including an upstream analyzer section having means for accelerating said ions along said path toward the downstream end thereof, and said analyzer means including a downstream analyzer section having a linear array of successively adjoining electrodes spaced along said path to define between successive pairs of said electrodes corresponding interelectrode stages progressively varying in length according to the progressively varying velocity of said ions of selected mass, and having an alternating potential source connected to said electrodes for providing adjacent electrodes in said array with alternatingly opposite polarities; and ion collecting means at the downstream end of said path for separating said ions of selected mass from other charged particles and for collecting said ions of selected mass.

4. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of successively adjoining electrodes spaced along said path to define between successive pairs of said electrodes corresponding interelectrode stages progressively varying in length according to the progressively varying velocity of said ions of selected mass, and including an alternating potential source connected to said electrodes for providing adjacent electrodes in said array with alternatingly opposite polarities, said electrodes in said array having lateral dimensions which are progressively variable along said path in proportion to the progressively varying spacing of said interelectrode stages along said path; and ion collecting means at the downstream end of said path for separating said ions of selected mass from other charged particles and for collecting said ions of selected mass.

5. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of apertured plates progressively variably spaced along said path according to the progressively varying velocity of said ions of selected mass, and including an alternating potential source connected to said apertured plates for providing adjacent plates in said array with alternatingly opposite polarities; and ion collecting means at the downstream end of said path for separating said ions of selected mass from other charged particles and for collecting said ions of selected mass.

6. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of electrodes providing a series of electrical field spaces progressively variably spaced along said path according to the progressively varying velocity of said ions of selected mass, and including an alternating potential source connected to said electrodes for providing adjacent electrodes in said array with alternatingly opposite polarities; spectrum sweeping means for varying a characteristic of the alternating potential provided by said source to vary said selected mass over a working mass range; and ion collecting means at the downstream end of said path for separating said ions of selected mass from other charged particles and for collecting said ions of selected mass.

7. A mass spectrometer as defined in claim 6 wherein said spectrum sweeping means comprises means for varying the frequency of said alternating potential.

8. A mass spectrometer as defined in claim 6 wherein said spectrum sweeping means comprises means for varying the amplitude of said alternating potential.

9. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of successively adjoining electrodes spaced along said path to define between successive pairs of said electrodes corresponding interelectrode stages progressively varying in length according to the progressively varying velocity of said ions of selected mass, and including an alternating potential source connected to said electrodes for providing adjacent electrodes in said array with alternatingly opposite polarities; means at the downstream end of said path for separating said ions of selected mass from other charged particles; and means for collecting said ions of selected mass.

10. A mass spectrometer as defined in claim 9 including means for introducing a gas mixture into said ionizing means.

11. A mass spectrometer as defined in claim 9 including means for continuously introducing a gas mixture into said ionizing means.

12. A mass spectrometer as defined in claim 9 wherein said ionizing means includes means for producing an electron beam.

13. A mass spectrometer as defined in claim 12 wherein said means for producing an electron beam includes a filament and a filament shield at least partially enclosing said filament.

14. A mass spectrometer as defined in claim 9 including means for maintaining the region occupied by said ionizing means at a reduced pressure and including means for admitting the sample substance into said region from a region of higher pressure.

15. A mass spectrometer as defined in claim 9, wherein said ionizing means includes: a cathode; means for heating said cathode to generate electrons; an ion chamber including apertured walls defining therebetween an ionization space wherein said electrons bombard the sample substance to produce said ions thereof, said apertured walls being positive with respect to said cathode so as to accelerate said electrons generated by said cathode in a beam through said apertured walls and thus through said ionization space; and a collector electrode on the path of said electron beam beyond said ionization space for collecting said electrons, said apertured walls electrically shielding said ionization space from said collector electrode and preventing secondary electrons formed at said collector electrode from entering said ionization space.

16. In a mass spectrometer, an ion collecting system for extracting from an ion beam, which extends along an ion path and which includes ions of different masses having correspondingly different kinetic energies, those ions of a selected mass having a corresponding, selected kinetic energy, the combination of: parallel, charged plates having a potential difference therebetween and positioned to receive said ion beam therebetween so as to differently deflect said ions therein in accordance with the respective kinetic energies thereof, said plates being disposed at an acute angle to said ion path; and an electrode in the field between said plates positioned to intercept said ion beam at a selected kinetic energy locus, said electrode extending into said field between said plates in a direction transversely of said plates and through an opening in one of said plates.

17. An ion collecting system for a mass spectrometer according to claim 16 including an opening in the other of said plates opposite said opening in said one plate, and including another electrode registering with said opening in said other plate.

18. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of electrodes providing a series of electrical field spaces progressively variably spaced along said path according to the progressively varying velocity of said ions of selected mass, and including a source of nonsinusoidal alternating potential connected to said electrodes for providing adjacent electrodes in said array with alternatingly opposite polarities; and ion collecting means at the downstream end of said path for separating said ions of selected mass from other charged particles and for collecting said ions of selected mass.

19. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of electrodes providing a series of electrical field spaces progressively variably spaced along said path according to the progressively varying velocity of said ions of selected mass, and including a source of pulse-waveform alternating potential connected to said electrodes for providing adjacent electrodes in said array with alternatingly opposite polarities; and ion collecting means at the downstream end of said path for separating said ions of selected mass from other charged particles and for collecting said ions of selected mass.

20. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of electrodes providing a series of electrical field spaces progressively variably spaced along said path according to the progressively varying velocity of said ions of selected mass, and including a source of alternating potential connected to said electrodes for providing adjacent electrodes in said array with alternatingly opposite polarities; means for cyclically modulating the frequency of said alternating potential; and ion collecting means at the downstream end of said path for separating said ions of selected mass from other charged particles and for collecting said ions of selected mass.

21. In a mass spectrometer, the combination of: ionizing means at the upstream end of an ion path for ionizing a gas mixture to produce ions thereof; means for maintaining the region occupied by said ionizing means at a reduced pressure; means for admitting the gas mixture into said region from a region of higher pressure; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of successively adjoining electrodes spaced along said path to define between successive pairs of said electrodes corresponding interelectrode stages progressively varying in length according to the progressively varying velocity of said ions of selected mass, and including an alternating potential source connected to said electrodes for providing adjacent electrodes in said array with alternatingly opposite polarities; and ion collecting means at the downstream end of said path for separating said ions of selected mass from other charged particles and for collecting said ions of selected mass.

22. In a mass spectrometer, the combination of: an envelope providing a path; source means in said envelope at the upstream end of said path for producing charged particles; first accelerating means in said envelope downstream from said source means and on said path for producing a continuous accelerating potential in a direction along said path toward the downstream end thereof so as to accelerate the particles along said path in said direction; second accelerating means in said envelope downstream from said first accelerating means and on said path, said second accelerating means including a plurality of aligned tubular electrodes spaced apart along said path and having a source of alternating potential connected thereto; and electrostatic focusing means for separating the particles according to kinetic energy, and for collecting those of the maximum energy, at the downstream end of said path.

23. A mass spectrometer according to claim 22 wherein said tubular electrodes increase in length and diameter from the upstream end of said second accelerating means toward the downstream end thereof.

24. A mass spectrometer according to claim 22 including a source of alternating potential connected to said tubular electrodes for applying thereto an alternating potential of nonsinusoidal waveform.

25. In an apparatus of the character described, the combination of: an envelope providing a path; source means in said envelope at the upstream end of said path for producing charged particles; accelerating means in said envelope downstream from said source means and on said path to accelerate such charged particles along said path, said accelerating means including a plurality of aligned tubular electrodes spaced apart along said path and having a source of alternating potential connected thereto, said tubular accelerators progressively increasing in length and diameter from the upstream end of said accelerating means toward the downstream end thereof in proportion to the increasing particle velocity along said path; and collecting means in said envelope at the downstream end of said path.

26. An apparatus according to claim 25 wherein $$L_n = KR_n$$

where $R_n$ is the radius of the $n$th gap between each pair of tubular electrodes, where K is a constant and where $L_n$ is the length of the $n$th interelectrode stage, each interelectrode stage extending from the midpoint of one tubular electrode to the midpoint of the next.

27. In a mass spectrometer, the combination of: accelerating means for charged particles including a linear array of tubular electrodes spaced apart along a linear path and increasing in diameter and length from the upstream end of said path toward the downstream end thereof; and a source of alternating potential connected to said electrodes for applying thereto an alternating potential of nonsinusoidal waveform.

28. In a mass spectrometer, the combination of: an ion source at the upstream end of an ion path; analyzer means on said path downstream from said ion source for selectively and progressively varying the velocities of ions produced by said ion source along said path according to the respective masses thereof so as to provide those ions of a selected mass with an optimum kinetic energy along said path; and an ion collecting system at the downstream end of said path for collecting said ions of selected mass, including parallel, charged plates having a difference of potential therebetween, said plates being positioned at an acute angle to said path to receive therebetween an ion beam extending along said path so as to differently deflect ions in said beam along parabolic paths having different peak positions between said plates in accordance with the respective kinetic energies thereof.

29. A mass spectrometer as defined in claim 28, including an electrode in the field between said plates positioned to intercept ions at a selected peak position.

30. In a mass-spectromter ion collecting system for extracting from an ion beam, which extends along an ion path and which includes ions of different masses having correspondingly different kinetic energies, those ions of a selected mass having a corresponding, selected kinetic energy, the combination of: parallel, charged plates having a difference of potential therebetween, said plates being positioned at an acute angle to said path so as to receive said ion beam therebetween and so as to differently deflect ions in said beam along parabolic paths having different peak positions between said plates in accordance with the respective kinetic energies thereof; and an electrode in the field between said plates positioned to intercept ions at a selected peak position.

31. In a mass spectrometer, the combination of: ionizing means at the upstream end of an ion path for ionizing a sample substance to produce ions thereof; analyzer means on said path downstream from said ionizing means for selectively and progressively varying the velocities of said ions along said path according to the respective masses thereof so as to provide those ions of a selected mass with an optimum kinetic energy along said path, said analyzer means including a linear array of electrodes providing a series of electrical field spaces progressively variably spaced along said path according to the progressively varying velocity of said ions of selected mass, and including an alternating potential source connected to said electrodes for providing adjacent electrodes in said array with alternatingly opposite polarities; adjustable tuning means for varying a characteristic of the alternating potential provided by said source to vary said selected mass within a working mass range; and ion collecting means at the downstream end of said path for separating said ions of selected mass from other charged particles and for collecting said ions of selected mass.

32. In a mass spectrometer, the combination of: an envelope providing a path; source means in said envelope at the upstream end of said path for producing ions; accelerating means in said envelope downstream from said source means and on said path, said accelerating means including a plurality of successively adjoining apertured plates variably spaced apart along said path at continually increasing intervals respectively proportional to the increasing velocities of ions therewithin, said plates having a source of alternating potential connected thereto; and an ion collecting system at the downstream end of said path for separating ions of selected mass from other charged particles and for collecting said ions of selected mass, including parallel, charged plates having a difference of potential therebetween, said plates being positioned at an acute angle to said path to receive therebetween an ion beam extending along said path so as to differently deflect ions from said beam along parabolic paths having different peak positions between said plates in accordance with the respective kinetic energies thereof.

33. A mass spectrometer as defined in claim 32, including means for altering the frequency of said alternating potential.

References Cited in the file of this patent

UNITED STATES PATENTS

| | | |
|---|---|---|
| 2,355,658 | Lawlor | Aug. 15, 1944 |
| 2,535,032 | Bennett | Dec. 26, 1950 |
| 2,545,595 | Alvarez | Mar. 20, 1951 |
| 2,587,647 | Pallette | Mar. 4, 1952 |
| 2,648,009 | Robinson | Aug. 4, 1953 |
| 2,660,677 | Nier | Nov. 24, 1953 |
| 2,688,088 | Berry et al. | Aug. 31, 1954 |
| 2,774,882 | Wells | Dec. 18, 1956 |

OTHER REFERENCES

Radio-Frequency Mass Spectrometer, published September 1948, National Bureau of Standards Technical News Bulletin, vol. 32, pp. 105–107.

Radio-Frequency Mass Spectrometer, by Willard H. Bennett, Journal of Applied Physics, vol. 21, February 1950, pp. 143–149.

"Production of Heavy High Speed Ions Without the Use of High Voltages," by Sloan et al., published in Physical Review, vol. 38, December 1, 1931, pp. 2021–2032.

"Recent Advances in the Production of Heavy High Speed Ions Without the Use of High Voltages," by Sloan et al., published in Physical Review, vol. 46, No. 7, October 1, 1934, pp. 539–542.

"Drift Tube Design in Linear Proton Accelerator," by Frank Oppenheimer, published by AEC, MMDC1310, pp. 1–6, dated June 27, 1946.

UNITED STATES PATENT OFFICE

CERTIFICATE OF CORRECTION

Patent No. 2,896,083                                            July 21, 1959

George H. Hare et al.

It is hereby certified that error appears in the printed specification of the above numbered patent requiring correction and that the said Letters Patent should read as corrected below.

Column 5, line 61, for "instead of a sine wave, and Figs. 4a and 4b respectively" read -- stituted for the sine wave. --; column 6, line 10, for "charged" read -- charge --; column 7, line 2, for "4R," read -- 4R, --; line 3, before "for the tubular electrodes 31" insert -- approximately --; line 11, for "receiver 5%" read -- received 5% --; same column 7, line 29, before "D.C." insert -- the --; line 33, before "for any particular" insert -- that --; column 8, line 50, for "particles" read -- particle --; column 9 line 12, for "mass curves" read -- these curves --; column 10, line 6, for "an" read -- and --; column 16, lines 61 and 62, for "potentential" read -- potential --.

Signed and sealed this 8th day of December 1959.

(SEAL)
Attest:
KARL H. AXLINE
Attesting Officer

ROBERT C. WATSON
Commissioner of Patents